(12) United States Patent
Zywiak

(10) Patent No.: US 6,942,183 B2
(45) Date of Patent: Sep. 13, 2005

(54) AIR CYCLE AIR CONDITIONING WITH ADAPTIVE RAM HEAT EXCHANGER

(75) Inventor: Thomas M. Zywiak, Suffield, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 73 days.

(21) Appl. No.: 10/716,313

(22) Filed: Nov. 18, 2003

(65) Prior Publication Data

US 2005/0061911 A1 Mar. 24, 2005

Related U.S. Application Data

(60) Provisional application No. 60/504,671, filed on Sep. 22, 2003.

(51) Int. Cl.$^7$ .............................................. B64D 13/06
(52) U.S. Cl. ........................ 244/118.5; 62/172; 165/101
(58) Field of Search ......................... 244/118.5; 165/44, 165/101; 62/87, 93, 172, 402

(56) References Cited

U.S. PATENT DOCUMENTS

| | | | |
|---|---|---|---|
| 1,580,504 A | * | 4/1926 | Lava ........................... 165/101 |
| 3,776,305 A | * | 12/1973 | Simmons ................ 165/104.25 |
| 5,101,640 A | * | 4/1992 | Fukushima et al. ......... 62/196.4 |
| 5,667,168 A | * | 9/1997 | Fluegel .................... 244/117 A |
| 5,906,111 A | | 5/1999 | Lui |
| 6,128,909 A | | 10/2000 | Jonqueres |
| 6,295,822 B1 | | 10/2001 | Mueller |
| 6,484,518 B1 | | 11/2002 | Laugt |

OTHER PUBLICATIONS

International Search Report, Dec. 29, 2004.

* cited by examiner

*Primary Examiner*—Galen Barefoot
(74) *Attorney, Agent, or Firm*—Carlson, Gaskey & Olds, PC

(57) ABSTRACT

An air conditioning pack for an aircraft provides primary and secondary heat exchangers arranged in a ram air duct. A third heat exchanger is arranged in the ram air duct and is fluidily connected to the primary and secondary heat exchangers. The overall or combined size of the primary, secondary, and third heat exchangers is less than that of the typical primary and secondary heat exchangers of the prior art. A combination of heat exchangers is used to provide cooling during worst case scenarios enabling efficient use of the overall heat exchangers configuration to provide the desired cooling capacity.

12 Claims, 3 Drawing Sheets

… (US 6,942,183 B2)

AIR CYCLE AIR CONDITIONING WITH ADAPTIVE RAM HEAT EXCHANGER

This application claims priority to U.S. Provisional Application No. 60/504,671, which was filed on Sep. 22, 2003.

BACKGROUND OF THE INVENTION

This invention relates to a heat exchanger configuration for an air conditioning pack of an aircraft air conditioning system.

Aircraft air conditioning system packs have ram air cooled heat exchangers that provide the heat sinks for the air flow which is being cooled prior to being supplied to the aircraft cabin. A typical pack has a primary heat exchanger that rejects heat generated by compressing the ambient air to the required pack inlet pressure. The pack also includes a secondary heat exchanger that rejects heat generated by the air cycle machine (ACM) compressor.

Each of the heat exchangers are sized for worst case conditions, which do not apply throughout most of the operation of the air conditioning pack. For example, the primary heat exchanger is sized for a high altitude/cruise condition, and the secondary heat exchanger is sized for a hot day/ground operation. Sizing the heat exchanger for these worst case conditions results in much larger heat exchangers than is necessary for most pack operating conditions. As a result the overall heat exchanger configuration is inefficient in that it takes up more space and provides more weight than is necessary.

Therefore, what is needed is an improved heat exchanger configuration for an aircraft air conditioning system pack.

SUMMARY OF THE INVENTION

The present invention provides an air conditioning pack for an aircraft comprising primary and secondary heat exchangers arranged in a ram air duct. A third heat exchanger is arranged in the ram air duct and is fluidly connected to the primary and secondary heat exchangers. A valve system selectively fluidly connects the third heat exchanger with at least one of the primary and secondary heat exchangers in response to a command from a controller. The controller determines when the primary and/or secondary heat exchangers requires supplemental cooling from the third heat exchanger.

The valve system fluidly connects the third and primary heat exchangers to provide a first pack cooling capacity, for example, sufficient for high altitude/cruise conditions. The valve system also fluidly connects the third and secondary heat exchangers to provide a second pack cooling capacity that is different than the first pack cooling capacity, for example, sufficient for hot day/ground conditions.

The overall or combined size of the primary, secondary, and third heat exchangers is less than that of the typical primary and secondary heat exchangers of the prior art. A combination of heat exchangers is used to provide cooling during worst case scenarios enabling efficient use of the overall heat exchanger configuration to provide the desired cooling capacity.

These and other features of the present invention can be best understood from the following specification and drawings, the following of which is a brief description.

DETAILED DESCRIPTION OF THE PREFERRED EMBODIMENT

Figure 1:
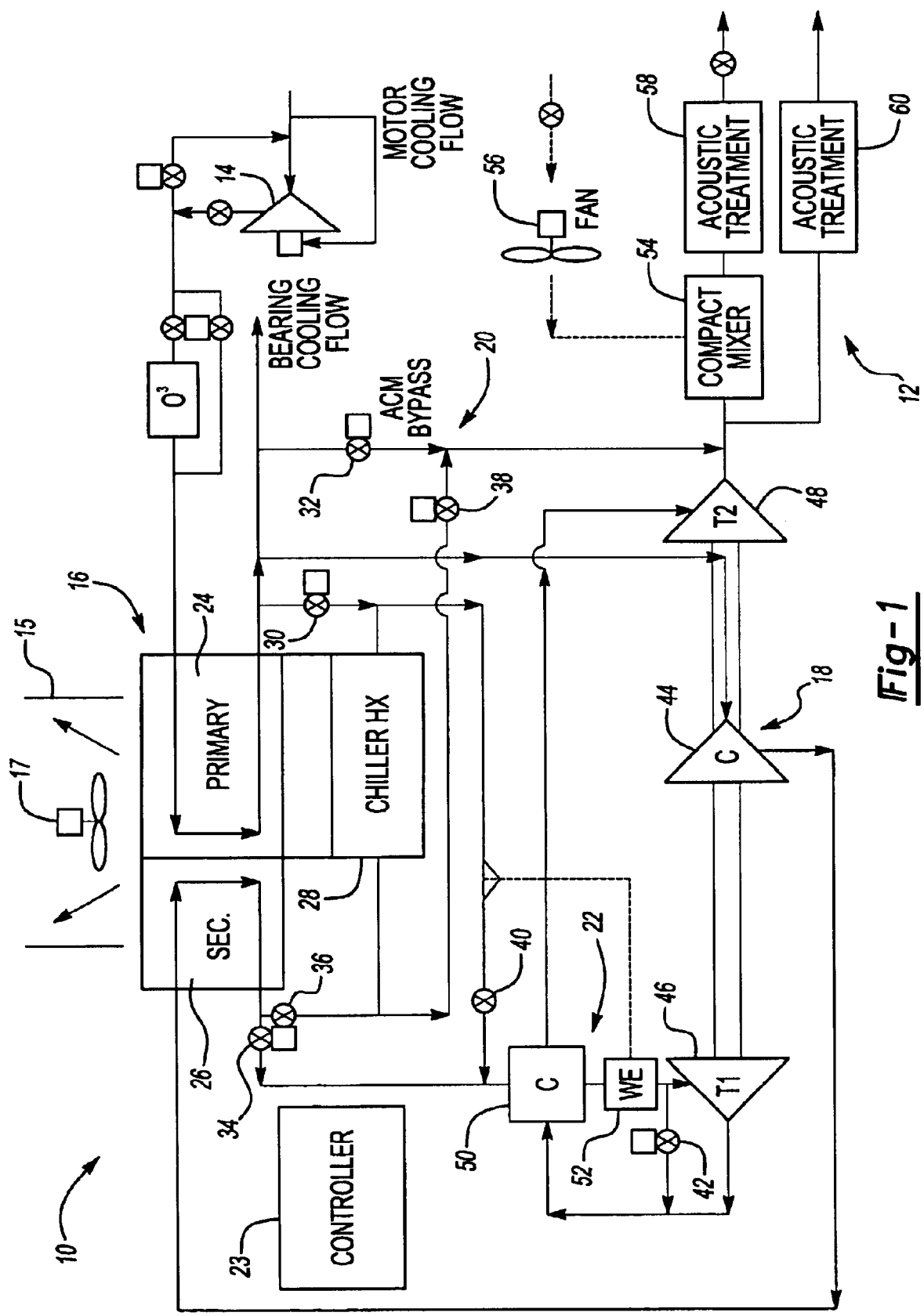
FIG. 1 is a schematic view of the inventive air conditioning pack.

An example of the inventive air conditioning pack 10 is shown schematically in FIG. 1. The pack 10 produces conditioned air that is provided to a distribution system 12 that delivers the air to the aircraft cabin. A supercharger 14 provides compressed air having a pressure desired by the pack inlet. The supercharger 14 is used as an alternative to bleed air from the aircraft's primary engines to provide more efficient operation of the aircraft.

The pack 10 includes a ram air duct 15 providing air flow through the heat exchangers 16, which provide the heat sink for the air as it is being conditioned within the pack 10. A fan 17 moves air through duct 15. An ACM 18 compresses and expands the air flowing through the fluid lines to produce conditioned air. The ACM 18 is a three wheel machine including a compressor 44 and first 46 and second 48 turbines. The ACM is of a conventional type, and is well known in the art. A valve system 20 is connected to a controller 23 and selectively opens and closes valves to manage the air flow as desired through the different flow paths. A humidity control system 22 removes moisture from the air at desired portions of the pack 10.

A relatively small primary heat exchanger 24 is arranged in the ram air duct. The primary heat exchanger 24 is sized to provide the necessary heat rejection at the ground or climb out condition to reach a nominal compressor outlet temperature. In current systems, the primary heat exchanger is sized at the high altitude cruise condition to be much larger than what is the required size for the low altitude condition thereby resulting in operating inefficiencies. The inventive secondary heat exchanger 26 is also arranged in the ram air duct 15. The secondary heat exchanger is sized to provide the necessary heat rejection at the cruise condition where its hot side flow is relatively low since most of the pack supply air is bypassed to the pack outlet. Typically, the secondary heat exchanger is sized at the hot day ground auxiliary power unit condition and is much larger than required at the cruise condition.

Since the primary 24 and secondary 26 heat exchangers of this invention are downsized as compared to prior art systems, supplemental cooling is needed to address the worst case cooling conditions. To this end, the invention utilizes a third heat exchanger 28 that may be selectively fluidly coupled to the primary 24 and/or secondary heat exchangers 26 to provide the desired cooling during the worst case conditions. Various combinations or configurations of the primary 24, second 26, and third 28 heat exchangers may be used to provide the desired cooling capacity for the cabin.

The valve system 20 includes a first valve 30 selectively permitting fluid flow between the primary heat exchanger 24 and/or the third heat exchanger 28 and humidity control system 22. A second valve 32 selectively permits fluid flow between the primary heat exchanger 24 and pack outlet. The second valve 32 is commonly referred to as the ACM bypass valve. A third valve 34 selectively permits fluid flow between the secondary heat exchanger 26 and the humidity control system 22. A fourth valve 36 selectively permits fluid flow between the second heat exchanger 26 and third heat exchanger 28. A fifth valve 38 selectively permits fluid flow between the third heat exchanger 28 and the pack outlet. A sixth valve 40 selectively permits fluid flow between the third heat exchanger 28 and the humidity control system 22. A seventh valve 42 selectively permits fluid flow between components within the humidity control system 22 such as a water collector 52 and a condenser 50.

The distribution system 12 receives conditioned air from the pack outlet and distributes it throughout the aircraft as desired. The distribution system 12 includes a mixer 54 that receives recirculation air from the cabin and mixes it with the conditioned air from the pack 10. The air from the mixer 54 and pack 10 travels through acoustic treatment devices 58 and 60, as well known in the art, to reduce the noise generated by the conditioned air flowing through the system.

Figure 2:
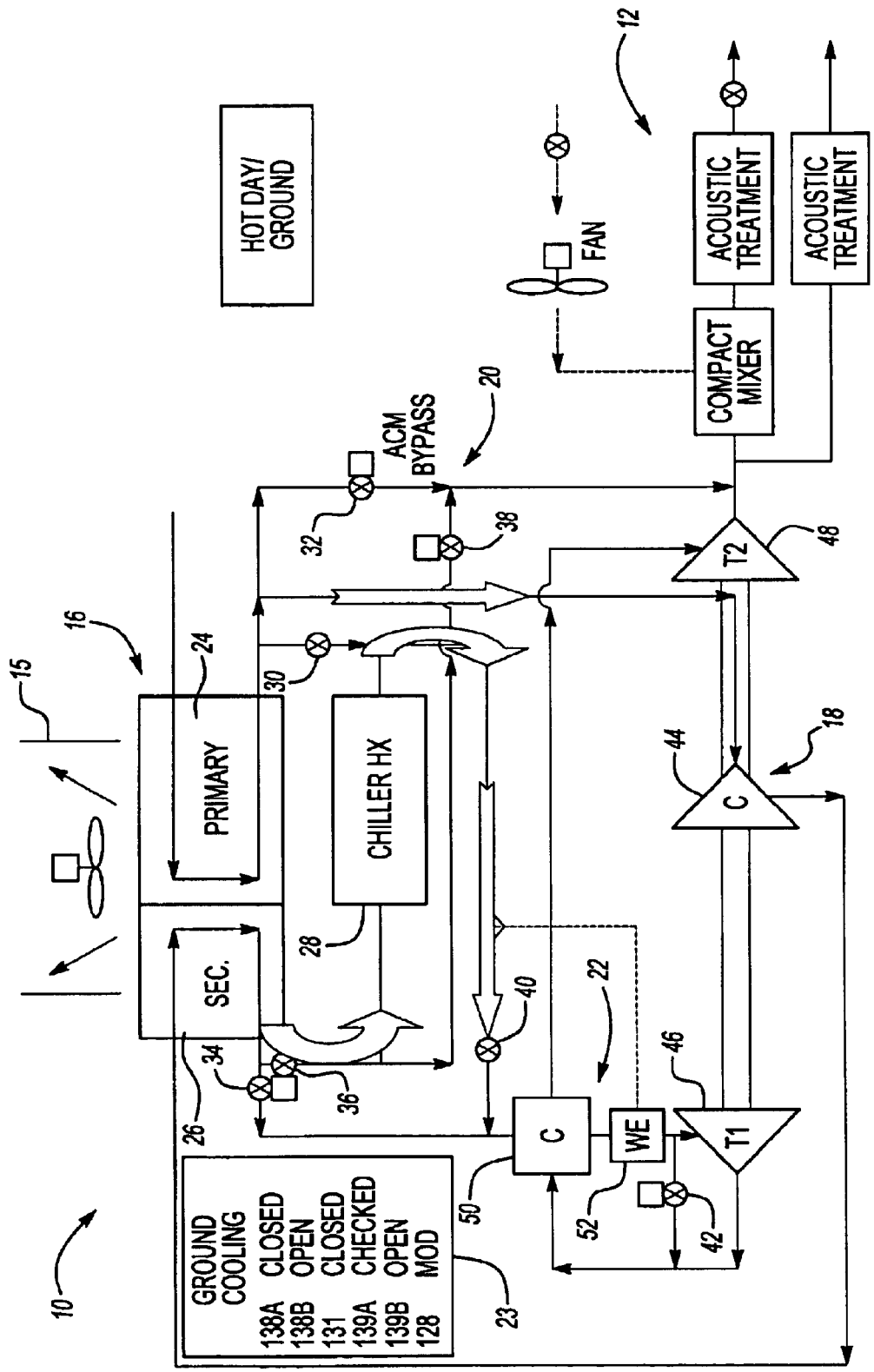
FIG. 2 is a schematic view of the inventive air conditioning pack during a hot day/ground condition.

FIG. 2 schematically depicts the pack 10 during a hot day/ground condition. The connections between the controller 23 and valves is omitted for clarity. Compressed air from the supercharger enters the primary heat exchanger 24. The second valve 32 may be opened or closed as necessary to provide the desired temperature air at the pack outlet. The first valve 30 is closed so that the air from the primary heat exchanger 24 flows into the compressor 44. The compressed air from compressor 44 enters the secondary heat exchanger. The third valve 34 is closed and the fourth valve 36 is opened so that the air from the secondary heat exchanger is directed to the third heat exchanger 28. The fifth valve 38 is closed and the sixth valve 40 is opened such that air from the third heat exchanger 28 flows into the condenser 50. From the condenser 50, the air flows into the water collector 52. The dehumidified air from the water collector is modulated through the seventh valve 42 so that the dehumidified air flows through the turbine 46 and/or back to the condenser 50. From the condenser 50 the air flows to the secondary turbine 48 where it exits through the pack outlet.

Figure 3:
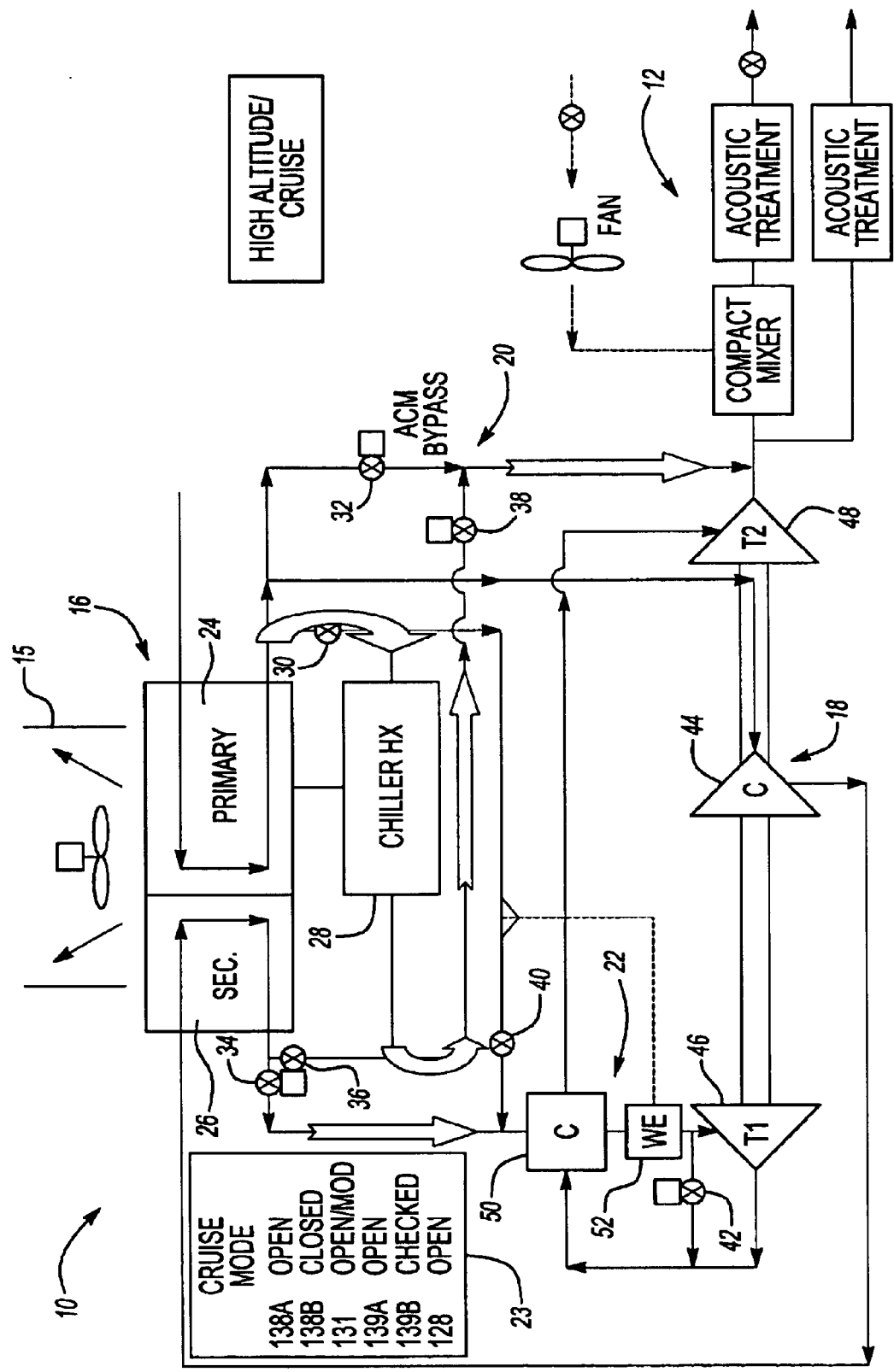
FIG. 3 is a schematic view of the inventive air conditioning pack during a high altitude/cruise condition.

A high altitude/cruise condition is schematically depicted in FIG. 3. Compressed air from the superchargers enters the primary heat exchanger 24. A desired quantity of air from the primary heat exchanger 24 flows through an opened or at least partially opened second valve 32 to the pack outlet. Air from the primary heat exchanger 24 flows through the opened first valve 30 into the third heat exchanger 28. The fifth valve 38 regulates the amount of fluid flow from the third heat exchanger 28 to the pack outlet.

A portion of the compressed air from the primary heat exchanger 24 also enters the compressor 44. Air from the compressor 44 flows into the secondary heat exchanger 26. The fourth valve 36 is closed and the third valve 34 is opened permitting fluid to flow from the secondary heat exchanger 26 into the humidity control system 22 where it flows into the first turbine 46 and then the second turbine 48. From the second turbine 48 the conditioned air exits the pack outlet.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An air conditioning pack for an aircraft comprising:
   primary and secondary heat exchangers;
   a third heat exchanger fluidly connected to said primary and secondary heat exchangers; and
   a valve system selectively fluidly connecting said third heat exchanger with at least one of said primary and secondary heat exchangers in response to a command from a controller, said valve system fluidly connecting said third and primary heat exchangers to provide a first cooling capacity, and said valve system fluidly connecting said third and secondary heat exchanger to provide a second cooling capacity different than said first cooling capacity.

2. The pack according to claim 1 comprising an air cycle machine fluidly connected to said heat exchangers.

3. The pack according to claim 2 comprising a humidity control system fluidly connected between said heat exchangers and said air cycle machine.

4. The pack according to claim 2, wherein said first cooling capacity corresponds to a high altitude/cruise condition with air from said primary heat exchanger flowing into said third heat exchanger, and said second cooling capacity corresponds to a hot day/ground condition with air from said secondary heat exchanger flowing into said third heat exchanger.

5. The pack according to claim 4, wherein said first cooling capacity is provided by a portion of air in said third flowing to a pack outlet for distribution, and another portion of air in said primary flowing to a compressor of said air cycle machine and from said compressor to said secondary heat exchanger, and air flowing from said secondary heat exchanger through a humidity control system to a first turbine of said air cycle machine.

6. The pack according to claim 5, wherein said first cooling capacity is provided by air flowing from said first turbine of said air cycle machine through said humidity control system to a second turbine of said air cycle machine and to said pack outlet for distribution with air from said third.

7. The pack according to claim 4, wherein said second cooling capacity is provided by air flowing from said primary heat exchanger through a compressor of said air cycle machine to said secondary heat exchanger.

8. The pack according to claim 7, wherein said second cooling capacity is provided by air flowing from said third through a humidity control system to a first turbine of said air cycle machine, and air flowing from said first turbine through said humidity control system to a second turbine of said air cycle machine and to said pack outlet for distribution.

9. The pack according to claim 2, wherein said air cycle machine is a three wheel machine having a compressor and two turbines.

10. The pack according to claim 1, wherein said valve system includes a first valve arranged between said primary and third heat exchangers, said first valve in an open position permitting fluid flow between said primary and third heat exchangers when providing said first cooling capacity and in a checked position regulating fluid flow between said primary and third heat exchangers when providing said second cooling capacity.

11. The pack according to claim 1, wherein said valve system includes a second valve arranged between said secondary and third heat exchangers, said second valve in an open position permitting fluid flow between said secondary and third heat exchangers when providing said second cooling capacity and a closed position preventing fluid flow between said secondary and third heat exchangers when providing said first cooling capacity.

12. The pack according to claim 1, wherein said heat exchangers are arranged in a ram air duct.

* * * * *